United States Patent [19]

Whalen et al.

[11] 4,404,918
[45] Sep. 20, 1983

[54] CLOSING WHEEL MOUNTING FOR A PLANTER

[75] Inventors: Bernard F. Whalen, Colchester; Clifford J. Roberts, Roseville, both of Ill.

[73] Assignee: Yetter Manufacturing Co., Colchester, Ill.

[21] Appl. No.: 301,730

[22] Filed: Sep. 14, 1981

[51] Int. Cl.³ ............................................. A01C 5/06
[52] U.S. Cl. ...................................... 111/85; 111/88; 172/538; 172/570
[58] Field of Search ..................... 111/85, 2, 3, 86–88, 111/52; 172/531, 538, 570, 572, 573, 574, 576, 602, 603, 657, 739, 714

[56] References Cited

U.S. PATENT DOCUMENTS

| 1,042,651 | 10/1912 | Davis et al. | 172/603 |
| 1,073,702 | 9/1913 | Owens | 111/3 |
| 2,584,012 | 1/1952 | Griffen | 111/85 |
| 3,654,713 | 4/1972 | Craddick et al. | 172/602 |
| 4,009,668 | 3/1977 | Brass et al. | 111/85 |

FOREIGN PATENT DOCUMENTS

| 1489215 | 7/1967 | France | 111/85 |
| 204757 | 4/1968 | U.S.S.R. | 111/85 |
| 550138 | 3/1977 | U.S.S.R. | 111/85 |
| 738539 | 6/1980 | U.S.S.R. | 111/3 |

Primary Examiner—Robert A. Hafer
Assistant Examiner—Danton DeMille
Attorney, Agent, or Firm—McWilliams, Mann, Zummer and Sweeney

[57] ABSTRACT

The invention relates to a seed planter having furrow forming means in association with a pair of furrow closing wheels each of which is independently mounted relative to the suspension of the other so that each spring biased suspension arm is pivotable to enable each closing wheel to be raised, or lowered, independently of the other wheel in response to ground conditions encountered in the operation of the planter. The closing wheel mounting also includes means for adjustment of each wheel whereby the angle of attack of each wheel may be varied and importantly enable adjustment of the wheel spacing so that the distance between the wheels can be adjusted and enabling the wheels to be set to run straight with the direction of travel of the planter and at any desired seed planting depth.

1 Claim, 6 Drawing Figures

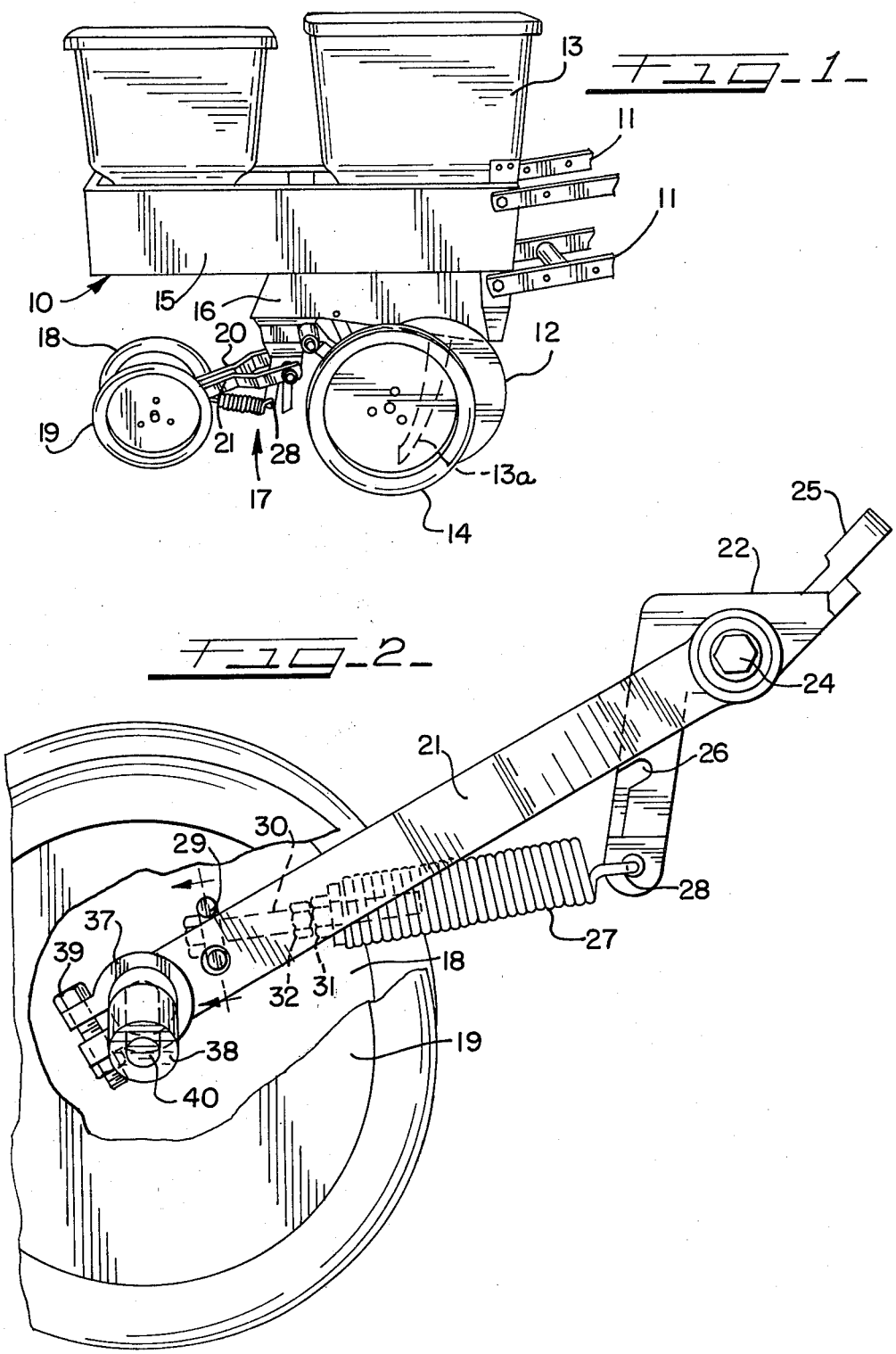

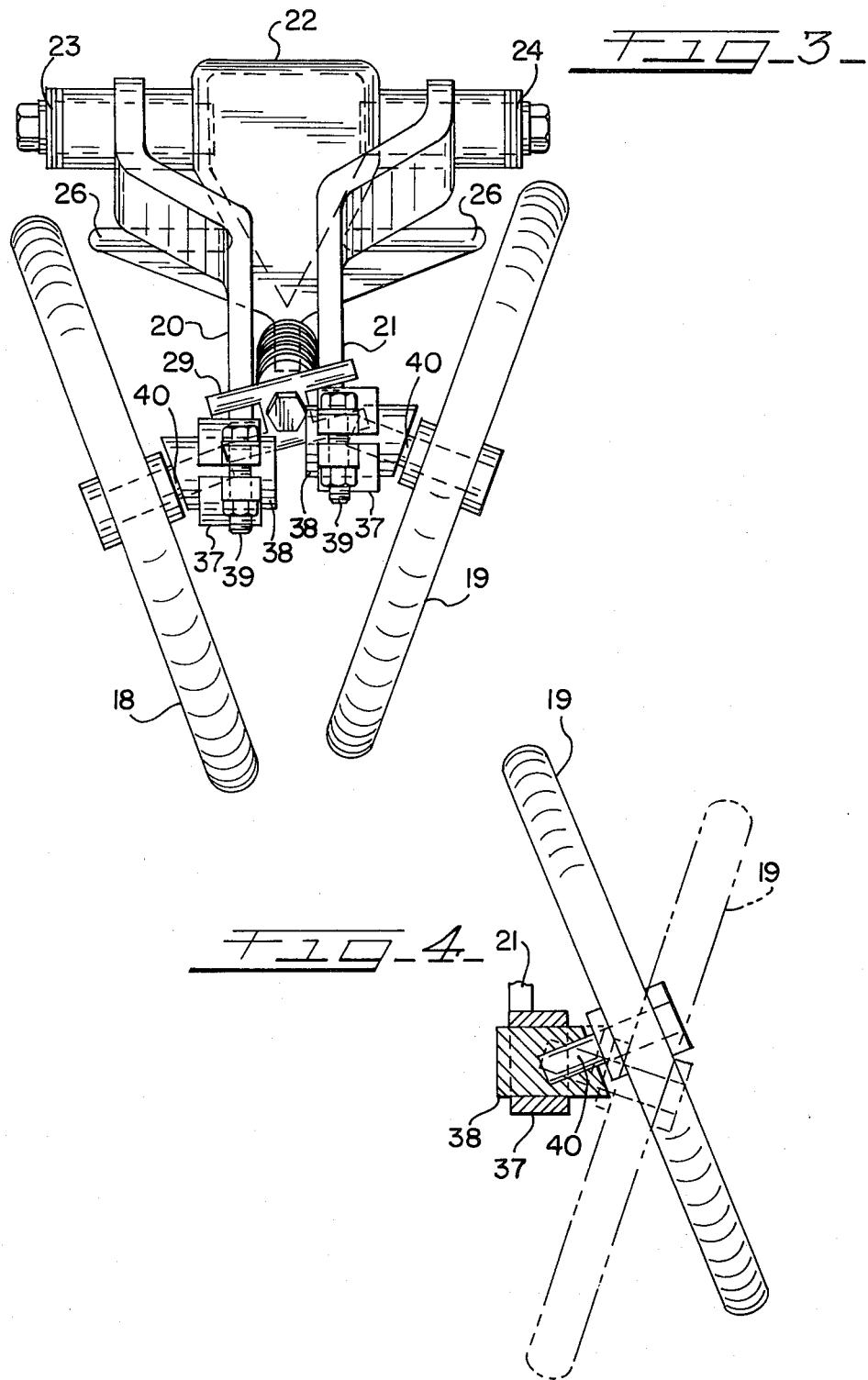

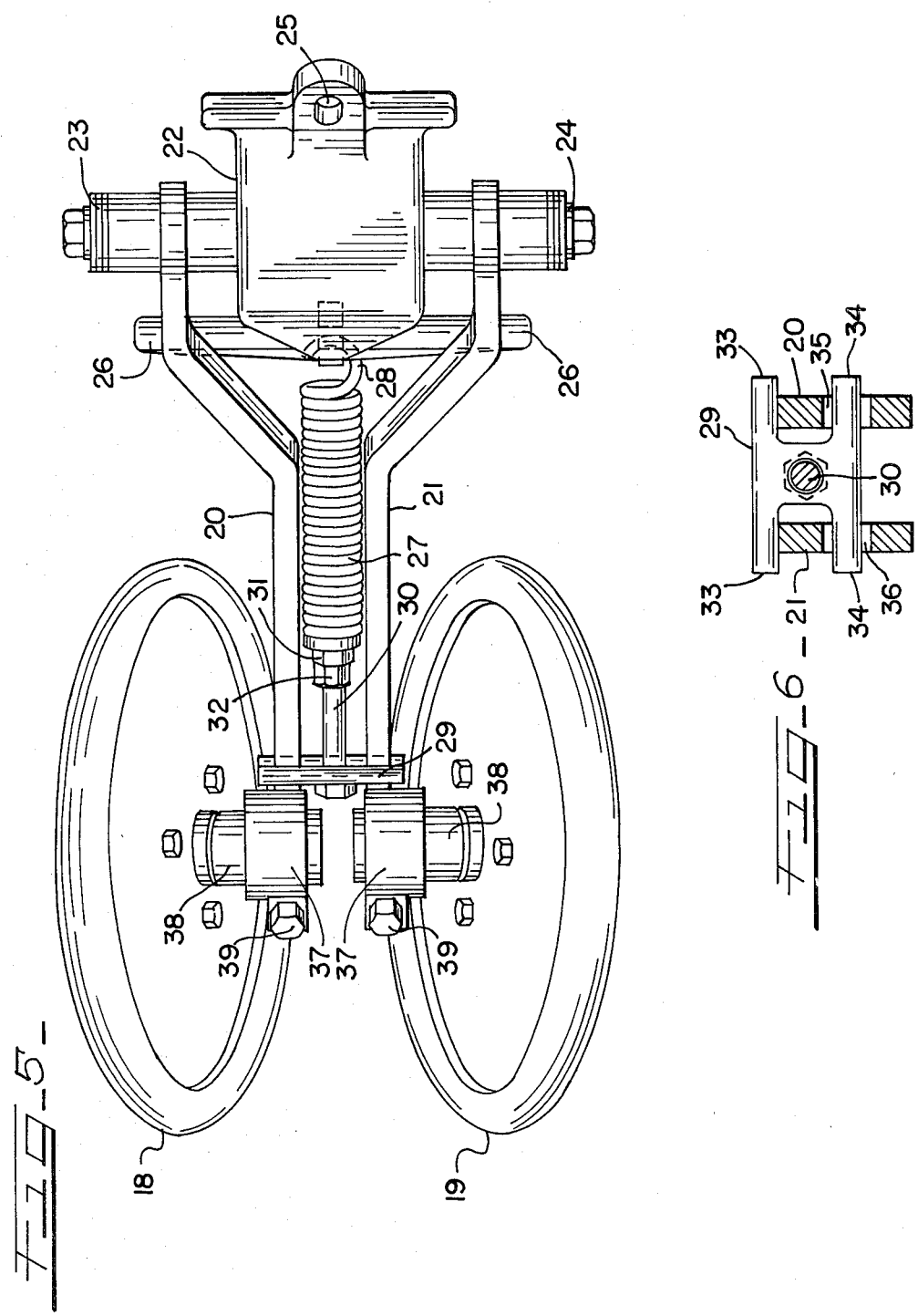

CLOSING WHEEL MOUNTING FOR A PLANTER

BACKGROUND OF THE INVENTION

1. Field Of The Invention

This invention relates to agricultural seed planting machines and is primarily directed to the closing wheel mounting arrangement for closing the furrow side walls over the planted seed.

2. Description Of The Prior Art

Heretofore, agricultural seed planters have been equipped with furrow forming disks in association with a pair of furrow closing wheels for closing the furrow, by moving the displaced soil at respective sides of the trench thus formed, over the seeds planted in the furrow, but such closing wheels have always been suspended from the planter frame in pairs, so that they moved up and down together as either wheel encountered some obstacle and deflected both wheels regardless of which side of the furrow the obstacle was found.

Some early patents disclosed closing wheels suspended by means of a pivoted arm which was deflectable against the pressure of a biasing spring, such as Myers U.S. Pat. No. 835,031, but this concept appeared to utilize but one closing wheel which necessarily had to engage soil on both sides of the furrow to close soil over the seeds in the trench.

Similarly, expired patent to McIntyre U.S. Pat. No. 2,704,524 discloses a single "packer wheel 37" that is pivotally suspended by means of a spring biased arm 40 but here it is quite obvious tht the wheel 37, as shown in FIG. 2 of the patent, is sufficiently wide to straddle the trench formed by the disk 27, the leading edge of which is aligned with approximately the median position of the packer wheel tread.

Existing patent to Truax U.S. Pat. 4,030,428 discloses a seed drill for planting native grass type seeds and includes an arrangement wherein a number of press wheel assemblies 56 are each disposed in alignment with a pair of converging disks which open the furrow to form a trench into which the seeds are fed and then these seeds are ridden over by the press wheels but it must be noted that only one press wheel is provided for each furrow and more importantly the press wheels are each fixedly mounted so that there can be no deflection according to ground conditions.

Stacy U.S. Pat. No. 4,070,974 discloses a disk type trench filler wherein the disk-like filler 10 trails behind a disk opener 26, in alignment therewith and is provided with oppositely curving, alternately extending segments 11 and 12 which engage the soil at respectively opposite sides of the trench, or furrow, to press the walls of the trench inwardly over the planted seeds. Here again only the one presser wheel is provided and while it is pivotally mounted for vertical deflection by means of the trailing arm 28 it has no independent action at opposite sides of the furrow.

Peterson U.S. Pat. No. 4,244,306 discloses a single "packer wheel 32" for each double disk opener 31 and is located behind the opener in alignment therewith so that it becomes apparent that it cannot function at respectively opposite sides of the furrow.

Early patent to Vivion U.S. Pat. No. 1,007,256 discloses an arrangement typical of old prior planter devices involving a furrow opener 2 and a pair of rigidly mounted, spaced disks 16 which have no means of spring biased vertical deflection but the gauge of the disks may be adjusted by means of the wedge-shaped block 20 disposed between the respective mounting arm 13 and the gauge plates 3. No provision is made for pivoting of the arms 13 mounting the disks 16 so that it is not possible for the disks to be deflected vertically in response to ground variations.

U.S. Pat. No. 4,009,668 to Brass et al. shows two closing wheels inclined relative to each other and operative at opposite sides of a seed trench but these wheels are both mounted on a rigid axle member that is bent to adapt to the inclination of the wheels and supported in a single arm that is pivotally mounted on the main frame to preclude independent wheel movement.

SUMMARY OF THE INVENTION

It is the primary purpose of this invention to improve the suspension of the closing wheel mounting on an agricultural seed planter, especially by providing for independent action of each wheel of an assembly, where the closing wheels are usually disposed in pairs and whereby each wheel of such a pair may be deflected in a vertical plane independently of the associated wheel. This enables each closing wheel to adapt to ground conditions at each side of a seed trench, or furrow and thereby insure that both wheels of a pair will effectively close the soil over the planted seed in the trench from opposite sides of the trench and with substantially equal closing pressure.

The invention also provides effective means for adjusting the angles of a pair of closing wheels relative to the ground and to vary the spacing between the wheels. Adjustment of the angular position of each wheel enables the wheels to be positioned for the best angle of attack relative to the ground but most importantly adjustment of the relative spacing between the wheels not only allows the distance between the wheels to be adjusted and set, but provides for also setting the wheels to run straight and parallel with the direction of travel and at the desired planting depth. These adjustments of the closing wheels are obtained by the use of a bushing in the mounting of each wheel that, upon rotation, causes the associated wheel to assume a greater, or lesser, angle relative to the ground and to move the wheels laterally with respect to each other to increase, or decrease, the relative spacing between the wheels. Each such bushing is mounted in the free end of a suspension arm for each wheel and the bushing is rotatable in the arm mounting and adapted to be fixed against rotation by a clamping action in the mounting. The bushing is concentric with the suspension arm mounting but a bore extends through the bushing at an oblique angle relative to the suspension arm mounting and a wheel supporting shaft, or axle, is mounted in this bore and extends beyond the suspension arm to one side for receiving the wheel. Thus, merely by releasing the clamping action of the mounting and rotating bushing, then reclamping the bushing, the angular disposition of the associated wheel and its spaced position relative to the other wheel, can readily be adjusted. Thus, the pair of closing wheels on each planter may be adjusted by the operator to obtain the most advantageous positioning of the wheels in accordance with ground conditions and the type of planting, or particular seeds, being used at the time.

DESCRIPTION OF THE DRAWINGS

The drawings of the invention illustrate a structure that provides the features described and in the drawings FIG. 1 is a general side elevational view of an agricultural planter equipped with the closing wheel arrangement of this invention;

FIG. 2 is a detail view to larger scale of a closing wheel suspension arrangement with one wheel broken away to show the obliquely disposed axle mounting for the wheel;

FIG. 3 is a rear elevational view of the pair of closing wheels in an operative position where one wheel is deflected upwardly as accommodated by the independent suspension of each wheel;

FIG. 4 is a detail of one closing wheel mounting showing the oblique axle disposition and the effect of rotating the axle bushing between extreme positions of the wheel with the generally normal position shown in dot-and-dash lines;

FIG. 5 is a top plan view of the closing wheel mounting and suspension arrangement showing the wheels individually mounted on separate suspension arms both biased by a single spring with a connection for the spring to both arms by means of an equalizer that enables each arm to be deflected independently of the other arm; and FIG. 6 is a detail view of the equalizer connection between the suspension arms with the spring connecting rod in the center of the equalizer.

DESCRIPTION OF PREFERRED EMBODIMENT

An important advantage of this invention lies in the mounting of each closing wheel for independent suspension from the main frame of a planter and this affords the great improvement that enables the trench, or furrow, to be properly closed over after the seed is deposited therein. In typical planting conditions normally encountered, the planter does not always operate perpendicularly to the ground and the ground is not always flat and level where the planting is done and if the planting trench is formed on a slope, it is desirable and very important that both sides of the trench be collapsed equally and more or less simultaneously over the seed in order to properly cover the seed for best results. If the slope is quite pronounced in relation to the planter angle, it is possible, as has occurred with prior planters, for the closing wheel on the upper side of the trench to attack the soil at that side more aggressively and in the absence of equal pressure at the other, or low side of the trench, cause the trench to be destroyed and actually kick the seed on top of the soil so that the planting in such area is lost. By the independent suspension of both closing wheels this invention develops substantially equal pressure at opposite sides of the seed trench whereby to cover the seed most effectively by turning the soil from both sides evenly over the seed.

As shown in FIG. 1, the planter 10 is of the type to be drawn by a tractor, or the like, with hitch connections 11 for that purpose. The planter incudes a typically mounted pair of disks 12 for opening a furrow, or trench, into which the seeds from seed reservoirs 13 are deposited through a seed delivery tube 13a. A pair of gauge wheels 14 controls the depth of the planting trench and therefore the depth of the seeds planted. The planter 10 includes a main frame structure 15 and 16 and it is from this structure that the closing wheel suspension mechanism 17 is supported for operation in a trailing position behind the furrow forming disks 12 and the gauge wheels 14 so that the closing wheels 18 and 19 can close the seed trench after the seeds are planted.

Each wheel 18 and 19 is suspended from the main frame by a separate suspension arm 20 and 21 respectively. Each suspension arm is pivotally mounted at respectively opposite sides of a mounting member 22, as at 23 and 24 and the member 22 is secured to the main frame at 25. The mounting member 22 is provided with an oppositely extending stop arm 26 that is engaged by the respective suspension arms 20 and 21 on their lower sides to limit downward movement of the arms and locate them in an aligned operative position at the start of a planting operation and from which position either wheel is free to be deflected upwardly in response to ground conditions.

The wheels 18 and 19 are biased downwardly by spring 27 which is anchored to the mounting member 22 as at 28 and at its opposite end the spring is connected to an equalizer connection 29 that extends between and is operatively connected with the respective suspension arms 20 and 21. The connection of the spring 27 to the equalizer 29 is made by means of a headed bolt 30 that extends through the equalizer with the bolt head on the outer side of the equalizer and the threaded other end of the bolt extending into the spring, where it is secured by nut 31 and locknut 32 which enable the tension on the spring to be adjusted, as reqired. As best shown in FIG. 6, the equalizer 29 comprises a generally H-shaped member with the upper and lower legs 33 an 34 extending laterally with the lower legs projecting through openings 35 and 36 in the respective suspension arms 20 and 21 and the upper legs 33 overlying the top edge of the respective suspension arms. The equalizer 29 is free to pivot on the spring connecting bolt 30 whereby each suspension arm 20 or 21, is free to move up or down as the equalizer turns about the pivot point 30. In this way an equal downward pressure is imposed on each suspension arm while allowing for ready deflection of either, or both arms as ground conditions necessitate. This action is clearly illustrated in FIG. 3.

The closing wheels 18 and 19 are rotatably mounted at the free ends of the respective suspension arms 20 and 21 and for this purpose each arm is provided with a clamping type generally circular bracket 37, rigid with the respective arms and adapted to mount a bushing 38 therein, which is clamped in the bracket and secured by a bolt 39 in each arm. The bushing 38 is adjustable in the bracket 37 by merely loosening the bolt 39 and rotating the bushing and then retightening the bolt. The wheels 18 and 19 normally are disposed at an inward inclination, as best indicated in FIG. 3 and this is obtained by mounting of the axle shafts 40 for the respective wheels at an oblique angle in the bushing 38, which is clearly shown in FIG. 4.

By adjustment of the bushings 38 in the clamping brackets 37 the relative angle of the wheels with respect to the ground can be varied and the effective spacing between the wheels can be changed to provide optimum conditions for operation of the closing wheels with respect to different soil conditions and according to trench formations developed by the furrow forming disks 12. By rotating the bushings 38 in the clamping brackets 37, the angle of attack of the wheels 18 and 19 relative to the ground, can be adjusted to obtain the most effective relationship of the wheels at respective sides of the seed trench to achieve the desired closing of the soil from both sides of the trench over the seeds.

The angular adjustment of the wheels 18 and 19 is infinitely variable as indicated by the extremes shown in FIG. 4, where the normal running condition is revealed by the dot-and-dash line position of wheel 19 with the extreme range of adjustment potrayed in the full line position of the wheel. From this figure it can be seen that bushing 38 is concentric with the clamping bracket 37, but since the wheel mounting axle shaft 40 is mounted in the bushing at an oblique angle, rotation of the bushing will cause the wheel to assume any position desired between the two extremes illustrated.

Thus, by rotating the bushings 38, the wheels can be caused to effectively increase the spacing therebetween and not only can this distance between wheels be adjusted, but the wheels can be set to run straight and true with the direction of travel of the planter and at any desired planting depth. These adjustments achieved by proper positioning of the bushings 38, are important to the improvements afforded by this wheel mounting arrangement, but of at least equal importance with this feature is the mounting of each wheel for independent suspension, whereby it can be deflected without affecting the outer wheel, or one wheel can operate on ground at a higher level than the other wheel with substantially equal pressure at both sides of a seed trench to avoid kicking dirt into the trench from only one side, as would happen if the wheels were paired on a coincident mounting, or such a mounting might kick the seeds out of the trench because of such one side engagement of a wheel on the high side of the trench. It is important that the closing pressure on both sides of a seed trench be substantially equal and this is impossible to achieve with wheels that are in effect locked together, but the independent suspension of each wheel as herein, enables both wheels to adjust automatically to ground conditions whether they be straight and level, or severely sloped.

CONCLUSION

From the foregoing, it can be seen that a closing wheel mounting arrangement for an agricultural seed planting machine has been provided wherein the suspension of a pair of associated closing wheels is obtained by a separate pivoted suspension arm for each wheel which enables each wheel of the pair to be deflected vertically in accordance with soil conditions without affecting the action, or operation of the other wheel and wherein adjustment of the wheels relative to each other and the ground may be effected by use of a rotatable mounting bushing having an obliquely disposed wheel mounting shaft.

What is claimed is:

1. An agricultural seed planter including
(a) a main frame attachable to a mobile power source;
(b) furrow forming means depending from said main frame;
(c) seed dispensing means including a seed delivery tube associated with said planter adapted to deposit seeds within the furrow;
(d) furrow closing means disposed rearwardly of said seed delivery tube including a pair of suspension arms, each arm pivotally connected to said main frame at one end, a pair of closing wheels, each wheel carried by and journalled on the other end of the respective suspension arms, biasing means exerting pressure on said arms to cause downward movement thereof, each wheel disposable on an opposite side of said furrow whereby each arm and associated closing wheel is movable up and down upon the pivotal movement of the respective suspension arms;
(e) each of said closing wheels disposed at a laterally inclined angle to the ground;
(f) means associated with at least one of said closing wheels and suspension arms to selectively vary the angle between sid closing wheel and ground;
(g) said means including a bushing in said other end of the suspension arm, said bushing having an obliquely disposed shaft therein mounting said wheel, and clamping means for fixing said bushing in the suspension arm, said means to vary the angle between said closing wheels and ground simultaneously resulting in an adjustment of the distance between said closing wheels at the point where said closing wheels engage the ground upon rotating said bushing;
(h) an equalizer connection between said suspension arms, said biasing means being anchored at one end to said equalizer connection, said equalizer having portions associated with each of said suspension arms, one said portion of the equalizer extending through each suspension arm and another portion of the equalizer overlying each suspension arm, said equalizer and biasing means being adapted to urge each said arm and associated wheel to a ground engaging position, and said biasing means and equalizer causing said closing wheels to apply substantially equal pressure at each side of the furrow irrespective of the relative levels of such sides.

* * * * *